Sept. 13, 1960　　　TAKESHI GOSHIMA　　　2,952,197
REFLEX MIRROR OPERATING MECHANISM COUPLED
WITH SHUTTER FOR REFLEX CAMERAS
Filed Jan. 3, 1957

INVENTOR.
TAKESHI GOSHIMA
BY
*Orville*
ATTORNEY.

United States Patent Office 2,952,197
Patented Sept. 13, 1960

2,952,197

REFLEX MIRROR OPERATING MECHANISM COUPLED WITH SHUTTER FOR REFLEX CAMERAS

Takeshi Goshima, Tokyo, Japan, assignor to Canon Camera Company, Inc., Tokyo, Japan, a corporation of Japan Filed Jan. 3, 1957, Ser. No. 632,299

Claims priority, application Japan June 21, 1956

2 Claims. (Cl. 95—42)

The instant invention relates to a reflex mirror operating mechanism coupled with the shutter winding mechanism in cameras.

An object of the instant invention is to obtain an appropriately designed reflex mirror operating mechanism of which the reflex mirror is maintained at the desired position with the highest degree of accuracy.

Another object thereof is to provide a reflex mirror operating mechanism having a relatively simple system of actuating springs.

Reflex mirror operating mechanisms coupled with the shutter tensioning or film winding mechanisms, in which the reflex mirror operating mechanism springs are tensioned by the shutter tensioning means, are known for conventional single lens reflex cameras. Before operation of the curtain shutter to make an exposure, the reflex mirror is swung up and the reflex mirror is automatically swung down after the exposure by releasing the upwardly swung mirror upon closure of the curtain to minimize the period during which the reflex mirror is swung up to a practical limit. However, these mechanisms have drawbacks due to the presence of unavoidable gaps or backlashes of relatively negligible amount at various connecting regions of the coupling mechanisms. The reflex mirror does not take its exact place in the viewing or swung-down position whether the mirror driving spring is tensioned or not. The reason is that before tensioning the mirror driving mechanism, the spring to swing the mirror down tends to press the mirror downwardly, while after the mirror driving spring has been tensioned, the action of this spring is stronger than that of the swing-down or reverting spring, so that the reflex mirror changes its location a very slight amount upwardly. This displacement of the reflex mirror is very critical, no matter how little, in respect of the sharpness of the picture, and in the extreme case the picture taken by cameras so equipped will be out of focus.

The device according to my invention eliminates these shortcomings by the help of appropriately designed mechanism of simple springs and the latching mechanism for the reflex mirror.

The objects, advantages and structure of the instant invention will become apparent from the description hereinafter following of an illustrative embodiment thereof and the drawing in which.

Figure 2:
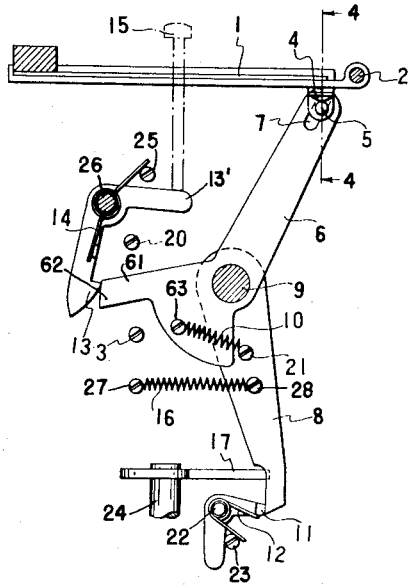
Fig. 2 illustrates a side view of said reflex mirror at its upswung position.

In the drawing, reflex mirror 1 is swingably mounted on a pivot shaft 2. A stop 3 is fixed to a camera wall to determine the down-swung position of the reflex mirror. An intermediate plate spring 4 is riveted at one end to the upper part of the mirror, the free end of the spring being provided with a pin 5. A two-armed coupling lever 6 is pivotally supported at the camera wall on a pivot 9. The upper arm of the lever 6 is provided with a fork 7 which engages the pin 5 of the plate spring 4 while its other arm 61 extends outwardly. A tensioning arm 8 is pivoted on pin 9, a tensioning spring 10 being connected between it and the coupling lever 6 by screws 63 and 21 in the respective levers. In the path of the free end of the lever 8 a latch 11 is pivoted on pin 22 in the camera wall with a spring 12 biasing the latch counterclockwise by bracing against screw 23. A screw 28, affixed in the tensioning lever 8, receives one end of the return spring 16 of which the other end is affixed to the camera wall by a screw 27. An L-shaped pawl 13 is also mounted on the camera wall by pivot pin 26 and a spring 14 is wound about the pivot pin, the pawl 13 being biased thereby to engage with the outwardly extending arm 62 of the coupling lever 6. A release button 15 is provided to push the horizontal arm $13_1$ of the pawl 13 downwardly to release the coupling lever 6. A cam 17 is secured at the top of shaft 24 to tension the tensioning lever 8 when the shaft 24 is rotated one turn by means of the film winding or shutter tensioning means. The latter mechanism or means may be of any type prior known in the art, such as a gear train of the proper ratio interconnecting the shaft 24 and the shutter curtain winding shaft, and is here not explained in detail. A projection 19 is affixed to a peripheral region of a rotatable disk 18 which rotates below the latch 11 to kick the free end of the latch, and releases the lever 8 from the latch after an exposure is made. The shutter curtain is released by the reflex mirror operating mechanism after the mirror 1 is lifted as shown in Figure 2, just as in the conventional reflex cameras.

The operation of the embodiment is as follows: The tensioning arm 8 first swings to the position shown in Fig. 1, from that shown in Fig. 3, by the action of cam 17, coupled to the shutter tensioning means, when the shutter is tensioned. Such movement of lever 8 tensions springs 10 and 16 and engages the free end of lever 8 with latch 11 to maintain the position shown in Fig. 1. Then shutter release button 15 is depressed, pawl 13 releases from lever 6 which eventually assumes the position shown in Fig. 2 by the combined action of spring 10 and pin 5 to swing reflex mirror 1 up about shaft 2. The reflex mirror releases the latch of the shutter curtain to make an exposure as soon as the mirror is in its upswung position. In relation with the running down of the shutter curtain, pin 19, coupled with the shutter curtain winding shaft, engages the lower end of latch 11 to release the arm 8 therefrom. Thereupon arm 8 is restored to the position shown in Fig. 3 by the force of return spring 16 so that through projection 21 lever 6 is turned clockwise. Spring 16 biases the coupling lever 6 clockwise, and thus the fork 7 forces the plate spring 4 to bend downwardly pressing the free end of the mirror 1 against the stop 3. Thus reflex mirror 1 is returned to the original swung down position by the action of lever 6 and intermediate spring 4. In this position, the plate spring 4 is bent somewhat, as shown by the dot and dash line in Figure 4, and keeps the mirror accurately in position. It must be noted that the reflex mirror of the instant embodiment is pressed down on the stop 3 by the plate spring 4 even before the mechanism is tensioned because of the shape of the coupling lever 6 and the location of the pawl 13 are so related that the plate spring is biased to press the mirror on the stop 3 by means of spring 16, projection 21, coupling arm 6, fork 7, pin 5 and spring plate 4. The stop 20 extending from a camera wall limits the movement of lever 6 in the clockwise direction and hence the action of the plate spring 4.

Figure 1:
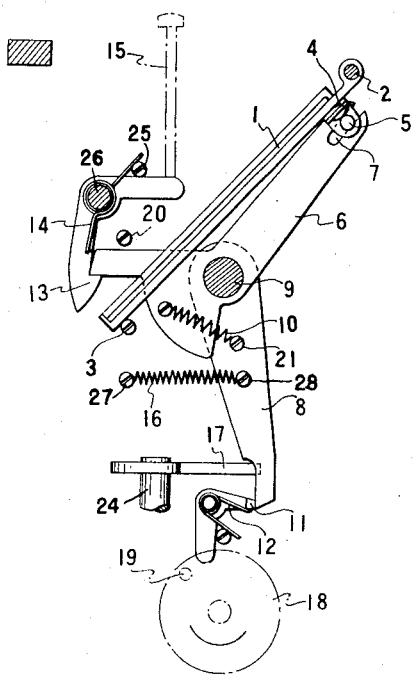
Fig. 1 illustrates a side view showing the reflex mirror operating mechanism according to the instant invention with the driving spring tensioned.
Figure 3:
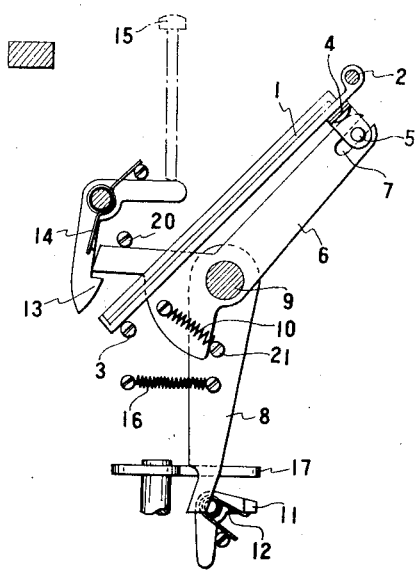
Fig. 3 illustrates a side view before tensioning the mirror driving spring.
Figure 4:
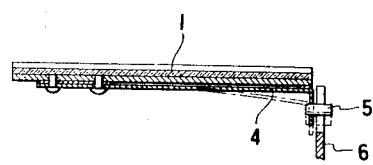
Fig. 4 illustrates a sectional view of the reflex mirror along line 4—4 of Fig. 2.
Figure 5:
Fig. 5 illustrates a plan view of the tensioning cam.

To explain more particularly, the intermediate spring 4 is subjected to no stress while reflex mirror 1 is in the process of swinging up and maintains its flat position in contact with the reflex mirror, as shown in full line in Fig. 4. After the reflex mirror returns to its original position against stop 3, some stress or bias is imparted to intermediate spring 4 by lever 6, regardless of whether lever 6 is tensioned by return spring 16 as shown in Fig. 3 or is tensioned by spring 10, as shown in Fig. 1. Thus said reflex mirror is biased elastically against stop 3 at all times. This feature is a very important characteristic of the instant invention.

To summarize: the essential feature of the reflex mirror operating mechanism according to the instant invention is to provide a reflex mirror in engagement with a conventional reflex mirror operating mechanism designed to tension the reflex mirror driving spring by an appropriate connection between the tensioning means and the shutter winding or film winding means. In these devices, the swung down position of the reflex mirror is maintained by latching the mirror directly to a pawl. In the general practical execution of these mechanisms, the part where the desired engagement is made so engages with the latching member that it is unavoidable to eliminate the small clearance between the stop (corresponding to stop 3) or latch for the mirror. A slight clearance will be produced between the mirror and the stop when the mirror driving spring is tensioned, and another slight clearance will be obtained after making an exposure between the mirror and the mirror latch to replace the first mentioned clearance which, of course, will disappear. It must here be noted that the photographer may perform the focusing operation when the mirror driving spring is both tensioned and released. Hence it is quite evident that any change in the clearance between the mirror and its stop or latch in the respective swung positions of the mirror would alter the mirror position, which in turn would influence the focusing. On the contrary, however, in the mechanism according to the instant invention, the reflex mirror is not latched by a latching member directly but employs the intermediate plate spring 4 to revert to its original position indirectly by the force of a return spring which actuates the coupling lever. Thus the reflex mirror according to my invention is elastically pressed by the intermediate spring between the reflex mirror and the coupling lever to tension the plate spring whenever the reflex mirror is in the viewing position, both before and after tensioning the mirror driving spring.

What I claim is:

1. In a reflex mirror operating mechanism for photographic cameras, the combination of a first tension lever pivotally supported and normally spring biased a predetermined amount in one direction of rotation, a second coupling lever copivotally supported with the first lever, a projection integral with the first lever and so positioned thereon that on movement beyond a predetermined point in the direction the first lever is biased the second lever moves with the first lever, a shaft, a mirror pivotable at its one end about the shaft, a plate spring attached at one end to the end region of the mirror adjacent to and parallel to the shaft, a stop for the other end of the mirror, means interconnecting the free end of the plate spring and the adjacent end region of the second lever so that the tension of the plate spring is aided by the bias of the first lever to engage the free end of the mirror resiliently against the stop, and means selectively applying additional bias at predetermined intervals so that the free end of the mirror is resiliently pressed against the stop both when the first lever is subjected to normal bias and when it is subjected to normal plus additional bias.

2. A reflex mirror operating mechanism coupled to and synchronized with the operation of the shutter winding mechanism of photographic cameras comprising a first lever pivoted on a camera wall, a first tension spring connected to the lever and the camera wall, a first stop, a first pin projecting from the first lever, a second lever supported copivotally with the first lever and having a pair of arms, the end of one arm of the second lever being forked, the other arm of the second lever being normally biased by the first spring against the first stop by the engagement of the first pin with such other second lever arm, a second spring connecting such other second lever arm and the first lever and being untensioned when such other second lever arm contacts the first stop, a shaft, a mirror pivotally hung at one end region on the shaft, a second stop adapted to engage the free end of the mirror when it is in the light intercepting position at substantially 45° from horizontal, a plate spring extending transversely the mirror to an end region of the mirror and parallel to the shaft, a second pin integral with the free end of the plate spring and so engaged to the forked arm of the second lever that the tension of the plate spring is additive to the normal bias of the first spring and tends to press the free end of the mirror against the second stop, a cam rotatable with the operation of the shutter winding means and of such contour and position that on completion of shutter tensioning the first lever is deflected a maximum about its pivot to tension the first spring a maximum, a third latching angle lever, a disk rotatable synchronously with the actuation of the shutter winding means, a third pin on the peripheral region of the disk, the third angle lever being spring biased and so mounted that one arm extends into the rotary path of the third pin while its other arm tends to engage with the free end of the first lever and does so engage therewith when the first lever is deflected its maximum by the cam to maintain the first lever at such maximum deflection, a fourth latching angle lever pivotally supported on the camera wall, one of its arms having a hooked end to engage with the second lever other arm, a shutter release button, the fourth angle lever being spring biased normally to engage its other arm to the release button and to position its hooked end in the path of the second lever other arm when such second lever other arm contacts the first stop and to engage with such second lever other arm when the first lever is pivoted a maximum by the cam, and a third stop against which the free end of the mirror rests with the mirror in the horizontal withdrawn position on depressing the shutter release button thereby releasing the hooked arm of the fourth angle lever from the second lever other arm and relieving the second spring so that the second spring tension swings the second lever and moves the mirror upwardly against the third stop to the horizontal withdrawn position, the simultaneous rotation of the disk engaging the third pin thereafter to rotate the third angle lever from the position in which the third lever other arm engages the first lever releasing the latter for movement under the tension of the first spring toward the low position of the cam now in its path, which movement ultimately and after the exposure is made engages the second lever other arm to the first stop and restores the mirror to its 45° from horizontal light intercepting position.

References Cited in the file of this patent

FOREIGN PATENTS

| | | |
|---|---|---|
| 726,693 | Germany | Oct. 19, 1942 |
| 887,006 | Germany | Aug. 20, 1953 |